Patented Jan. 23, 1945

2,367,880

UNITED STATES PATENT OFFICE 2,367,880

PROTECTIVE COATING FOR ARTICLES

Gunnar Lindh, Detroit, Mich., assignor to Udylite Corporation, Detroit, Mich., a corporation of Delaware No Drawing. Application May 2, 1942,
Serial No. 441,478

4 Claims. (Cl. 260—41)

This invention relates to protective coatings for articles and more particularly to protective coatings for articles useful in performing chemical processes such as liquid chemical dips, electrochemical cleaning, electroplating, chemical oxidation, phosphatizing, chromatizing, etc.

Machines and parts thereof used in chemical treatment are corroded or otherwise affected by the chemical treatment. For example, work holding racks and tanks for the electrolytes used in electrodeposition of metal are corroded by reacting with the electrolytes and metal is deposited on the racks. It is the object of this invention to produce a protective coating for such machines and machine parts which will effectively protect the same against reactive contact with the chemicals, either gaseous or liquid, used in well-known chemical treating processes.

This object has been achieved by coating the machine or machine parts with a protective film comprising co-polymerized vinylidene chloride and vinyl chloride.

One purpose of this invention is to provide coatings and linings which show a high chemical resistance, especially to such solutions as are used in the plating art.

Another object of this invention is to provide a coating of superior adhesion to the metal article in question.

This invention also contemplates a coating for plating and treatment tanks, plating racks and the like which can be quickly and easily applied by ordinary methods such as spraying, dipping, etc.

Another object of this invention is to provide a coating which can be easily repaired by puttying and which, on standing, is not subject to any chemical or physical change which would make a subsequent application difficult or impossible because of thickening.

I have found that these objects can be attained by the use of a coating consisting of a co-polymer of vinylidene chloride and vinyl chloride, manufactured by The Dow Chemical Company under the trade name Saran B, and finely divided siliceous material.

For maximum chemical resistance, the proportion of vinylidene chloride in the co-polymer should be as high as possible and still permit solubility at room temperature in ketone type solvents. Thus, I prefer to use a co-polymerized resin made from at least half of its weight of vinylidene chloride and preferably more.

The relative proportions of the resin and the siliceous material vary considerably, but as a general rule, I prefer to keep the amount of siliceous material at about one-third of the resin content. If the content of siliceous material is less than one-eighth of the resin content, the adhesion is insufficient for my purpose. If the content of siliceous material is increased to about two-thirds of the resin content, the chemical resistance of the coating suffers. Also, the elasticity decreases too far to permit the coating to be employed on racks. Hence, the amount of siliceous material which I use comprises from one-eighth to two-thirds of the resin content, on a weight basis.

All siliceous materials which I have tried have been found satisfactory. Examples are diatomaceous earth, silica sand, glass, magnesium silicates, aluminum silicates and pumice. These materials must be very finely divided in order that they stay in suspension and fulfill their function of providing adhesion. Fair results can be had with a particle size as large as 325 mesh, but for best results, the siliceous material should be much finer, preferably of colloidal size of the order of 35 microns and less.

It has already been indicated that ketone type solvents are preferred. Other solvents which may be used are of the ether type such as dioxane and iso-propyl ether; also, nitro-paraffins such as 1-nitro-propane in conjunction with the ketones or ethers. One may also use diluents such as aromatic naphthas in amounts not exceeding 15% by weight of the total solvent combination. A suitable solvent mixture for air drying or force drying at temperatures as high as 225° F. consists of 60% by weight of methyl ethyl ketone and 40% by weight of cyclohexanone or 40% by weight of methyl ethyl ketone, 20% by weight methyl iso-butyl ketone and 40% by weight cyclohexanone.

The exact proportion of solvents and resin naturally depends on the manner in which the coating is to be applied. When the coating material is applied by dipping, its resin content can be high. A suitable combination is about 20–27% by weight of resin with about 80–73% by weight of solvents.

The same solvent mixture may be used for spraying, but the percentage of solvent to resin must be higher such as 85% by weight of solvent and 15% by weight of resin.

In preparing the coating material, the resin is first dissolved in the solvent mixture by agitation. The finely divided siliceous material may then be introduced with sufficient homogeneity by agitation alone. For best results, however, I prefer to first make a paste on a two or three roll mill, using then only part of the solvent on the mill, later adding the remaining quantity needed in the batch.

I have kept samples of coating solutions for over six months and have found no jelling or change in viscosity during this period. When the siliceous material was of colloidal size, I found no settling in the bottom of the container. Coatings prepared from such old solutions were equal to those made with fresh solutions in all respects In coating a rack for electrochemical processing and the like, I proceed as follows: the coating solution is kept in a container and the rack is lowered into it sufficiently slowly that air be not entrapped with the coating. The rack is then withdrawn at a low rate of speed, approximately 1-2 feet per minute. Any drops of coating material adhering to the lower end are easily wiped off with a stick, and the coating re-forms rapidly over this area because of its high surface tension. The rack is now allowed to air dry for about one hour or force dry for example at 225° F. for twenty minutes. Subsequent coatings are then applied in the same manner until the required total thickness is obtained. Every other coating application is made with the rack turned upside down to equalize the distribution of the coating. Six coatings are sufficient for most ordinary purposes. For best results, force drying at a temperature of about 200-225° F. for about two hours is employed after the final coating has been applied. Instead of force drying in an oven, the rack may be held in hot water overnight.

As the solvents are evaporated, the hardness and adherence increase to maximum. No further increase in hardness takes place because of oxidation, and the coating stays flexible and does not crack during use.

Tanks and similar containers which on account of their size, cannot be dipped, are best coated by spraying. A thin coating is applied at a time and dries sufficiently quickly so that when the whole object has been given one coat, it is usually ready for another coating.

These coatings have shown an unusual and unexpected resistance to the action of chemicals used in the plating art. Thus, for example, coatings of my material $\frac{1}{16}$" thick withstood immersion in a standard chromium plating solution containing 33 oz. per gal. of chromic acid and .33 oz. per gal. of sulphuric acid, operated at a temperature of 110° F. continuously for twenty-four hours without showing any evidence of attack or change of any sort. The same coating was immersed for the same length of time in an alkaline cleaning solution containing about 12 oz. per gal. of a mixture of sodium phosphates, sodium silicates and caustic soda at 210° F. without showing any change in properties. Other coatings heretofore used, applied in the same thicknesses, were definitely inferior in some respect or another. Thus, for example, a coating consisting of a co-polymer of vinyl chloride and styrene completely lost adhesion in the above-mentioned alkaline cleaner test. A co-polymer of vinyl chloride and vinyl acetate lost much adhesion and became embrittled during the same test. Other commonly used rack coatings of unknown composition corroded rapidly in the alkaline cleaner. Cellulose and rubber coatings which I tried were rapidly attacked by the chromic acid bath, being dissolved in the bath and causing a reduction of hexavalent chromium to trivalent chromium.

My coating has also been used in other solutions such as cyanide plating solutions and bright nickel plating solutions as well as acid pickling solutions. A remarkable chemical resistance and absence of hardening and cracking has been demonstrated. No change in adhesion has been noticed.

As far as I have been able to ascertain, this coating can be used equally well in any known plating process.

I claim:

1. A liquid coating composition adapted to be applied to a metal surface while in a liquid state to form a coating upon the evaporation of the solvent, said coating having high chemical resistance, good adhesion to the metal surface and toughness, said composition comprising essentially co-polymerized vinylidene chloride and vinyl chloride, a solvent for said co-polymer, and a finely divided solid, siliceous material in suspension in the solution of co-polymer and having a particle size capable of passing through a 325 mesh seive, the finely divided siliceous material being present in the solution in an amount falling within a range of from $\frac{1}{8}$ to $\frac{2}{3}$ of the co-polymer content by weight.

2. A liquid coating composition adapted to be applied to a metal surface while in a liquid state to form a coating upon the evaporation of the solvent, said coating having high chemical resistance, good adhesion to the metal surface and toughness, said composition comprising essentially a co-polymerized resin prepared from at least 50% by weight of vinylidene chloride and a lesser amount of vinyl chloride, a solvent for said co-polymer, and a finely divided, solid siliceous material in suspension in the solution of co-polymer and having a particle size capable of passing through a 325 mesh seive, the finely divided siliceous material being present in the solution in an amount falling within a range of from $\frac{1}{8}$ to $\frac{2}{3}$ of the co-polymer resin content by weight.

3. A liquid coating composition adapted to be applied to a metal surface while in a liquid state to form a coating upon the evaporation of the solvent, said coating having high chemical resistance, good adhesion to the metal surface and toughness, said composition comprising essentially a co-polymerized resin prepared from at least 50% by weight of vinylidene chloride and a lesser amount of vinyl chloride, a solvent for said co-polymer, and a finely divided, solid siliceous material in suspension in the solution of co-polymer and having a particle size capable of passing through a 325 mesh sieve, the finely divided siliceous material being present in the solution in an amount falling within a range of from $\frac{1}{8}$ to $\frac{2}{3}$ of the co-polymer resin content by weight, the said resin being present in the composition in an amount falling within a range of from 15% to 27% of the total resin-solvent content by weight and the solvent being present in the composition in an amount falling within a range of from 85% to 73% of the total resin-solvent content by weight.

4. A liquid coating composition adapted to be applied to a metal surface while in a liquid state to form a coating upon the evaporation of the solvent, said coating having high chemical resistance, good adhesion to the metal surface and toughness, said composition comprising essentially co-polymerized vinylidene chloride and vinyl chloride, a solvent for said co-polymer, and particles of siliceous material of colloidal size in suspension in the solution of co-polymer, the said colloidal siliceous material particles being present in the solution in an amount falling within a range of from $\frac{1}{8}$ to $\frac{2}{3}$ of the co-polymer content by weight.

GUNNAR LINDH.